United States Patent [19]
Venables et al.

[11] Patent Number: 4,821,962
[45] Date of Patent: Apr. 18, 1989

[54] PROPELLER NOZZLES THEREBY REDUCING LATERAL FORCES

[75] Inventors: Anne Venables, Boissy l'Aillerie; Dominique Regard, Bourg la Reine; Gérard Laruelle, Le Plessis Robinson, all of France

[73] Assignee: Office National d'Etudes et de Recherche Aerospatiales (ONERA), Chatillon, France

[21] Appl. No.: 79,016

[22] Filed: Jul. 29, 1987

[30] Foreign Application Priority Data

Aug. 4, 1986 [FR] France ................. 86 11269

[51] Int. Cl.$^4$ .............. B64D 33/04; B63H 11/10
[52] U.S. Cl. .................... 239/265.15; 239/265.19
[58] Field of Search ............ 239/265.11, 265.15, 239/265.19; 60/230, 264, 271

[56] References Cited
U.S. PATENT DOCUMENTS

| | | | |
|---|---|---|---|
| 2,944,623 | 7/1960 | Bodine | 60/271 X |
| 3,048,972 | 8/1962 | Barlow | 239/265.15 |
| 3,057,148 | 10/1962 | Kimpel | 60/271 |
| 3,237,402 | 3/1966 | Steverding | 239/265.15 X |
| 3,352,495 | 11/1967 | Fischer | 239/265.15 |
| 3,749,317 | 7/1973 | Osofsky | 239/265.19 |
| 3,877,646 | 4/1975 | McCullough | 239/265.19 |
| 4,434,614 | 3/1984 | Gill | 239/265.19 X |

Primary Examiner—Andres Kashnikow
Assistant Examiner—Patrick N. Burkhart
Attorney, Agent, or Firm—Laubscher, Presta & Laubscher

[57] ABSTRACT

A propeller nozzle, particularly for a missile, comprises a revolution pipe having a forward convergent portion, a minimum section, and a rearward divergent portion with a large outlet throat section. The invention is designed to minimize lateral forces in the nozzle due to a separation of gaseous fluid exhausting from the propeller, during the start of the propeller pressure increase. For this purpose, the pipe comprises means disposed in the vicinity of a section internal to the divergent portion and substantially downstream from the minimum section for making a gaseous fluid separation stable, symmetrical and coaxial to the nozzle. These means can include a groove and/or a projection, preferably destroyable through mechanical erosion and/or melting under the effects of the gaseous fluid.

7 Claims, 3 Drawing Sheets

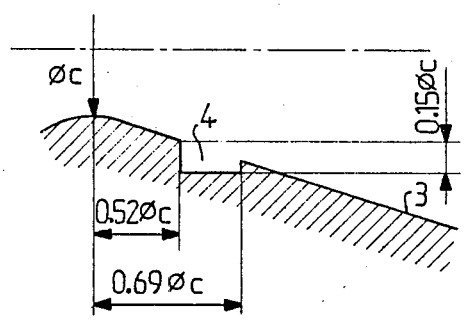
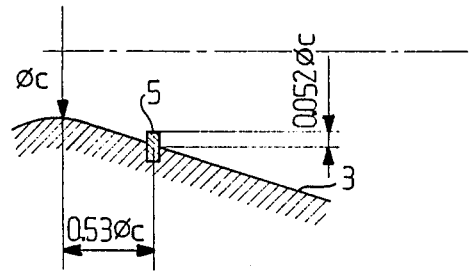
FIG-4    FIG-5
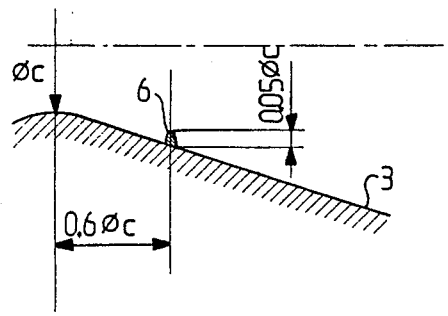
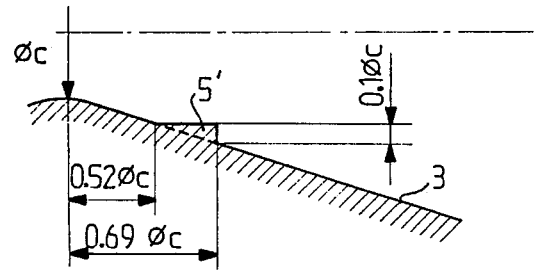
FIG-6    FIG-7
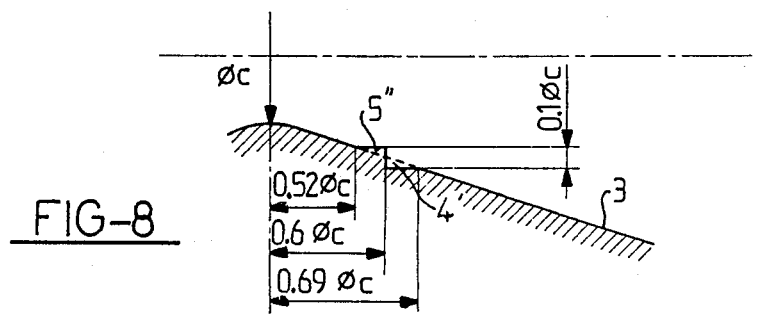
FIG-8

PROPELLER NOZZLES THEREBY REDUCING LATERAL FORCES

BACKGROUND OF THE INVENTION

1. Field of the invention

The present invention relates to a propeller nozzle, particularly for a missile or rocket, in which troublesome lateral forces can occur.

This type of nozzle ejecting a propulsive gaseous fluid at the rear of a missle, consists of a forward convergent portion, a minimum intermediate section, called a throat, and a rearward divergent portion coupled to the minimum throat section and having a rearwardly increasing section, with respect to the direction of missile movement.

2. Description of the Prior Art

The operation of highly superexpanded nozzles results in more or less considerable gaseous fluid separation in the divergent portion and, with certain relatively low expansion rate values, the separation is of a dissymetric and sometimes unstable nature.

During the separation phases of missile stages, this nozzle operation is characteristic of the priming phase during which the propeller pressure is progressively established in a few milliseconds. The presence of the base of the lower stage tank close to the outlet of the nozzle is an additional cause for dissymetric fluid separation owing to equipments which are distributed asymmetrically on it; the same applies to possible turning of the nozzle and when the two stages are no longer in line. When the nozzle has a high cross-sectional ratio, the dissymetric fluid separation phenomenon results in a sometimes considerable lateral force which slightly and temporarily modifies the stability of the upper part of the missile and which can produce forces prohibitive to the structure of the nozzle and the control actuators of the nozzle.

The same problem is encountered in launcher nozzles whose divergent portion outlet i.e., the cross-sectional exit area of the nozzle, is optimized to obtain the best possible performance over the whole of the launcher trajectory and which can operate in a superexpanded state at low altitudes. For example, in U.S. Pat. No. 3,237,402 is described a variable thrust nozzle for a missile in which the exit area of the nozzle gradually increases as the pressure of the atmosphere outside of the nozzle decreases so as to substantially achieve optimum thrust at all altitudes. The gradual increase of the nozzle exit area is carried out by the use of several removable smooth ring-shaped ramps that are disposed concentrically within the divergent portion and arranged sequentially from front to rear thereof with the rearward end of the forward ramp contiguous the forward end of the ramp immediately to the rear thereof. Each of the ramps is ejected at a predetermined time dependant on the exhaust gas pressure and, therefore, on the gas temperature communicated to the ramp, by means of ignition of explosive attaching bolts thereby increasing the exit area of the nozzle to the size of the ramp in line. The ramps have a "continuous" task during the ascension of the missile that is, typically, a few minutes, 2 to 5 minutes approximately, depending on the required flight altitude corresponding to the stabilized flight of the missile.

Thus, in such a nozzle, the forward ramp in combination with the convergent portion and the throat portion is equivalent to a nozzle having a short smooth divergent portion at the start of the propeller pressure increase, i.e., for 10 to 50 ms approximately, and the problems of lateral forces in the nozzle during this start phase are not solved.

Observations and experimental measurements have shown that a nozzle is subjected to lateral forces, all the greater when the ratio of the divergent portion outlet section to the throat section is high. These forces briefly develop at the start of the propeller pressure increase. Although these forces have very limited consequences on the stability of the missile, owing to the fact that they are brief, they are very important where the design and construction of the nozzles and piloting devices associated with the missile are concerned. In the case of a missile with separable stages, these lateral forces develop when the ratio of the internal pressure of the gases in the propeller becomes some 2 to 10 times that in the intermediate stage of the missile.

These lateral forces are due to a separation or breakdown of the gaseous fluid exhausting from the propeller and which is located in the nozzle, when it is superexpanded. The position of the separation depends on the ratio of the pressure in the propeller to the pressure downstream from the nozzle, i.e., in the rearward end of the nozzle. Wind tunnel tests have confirmed that, when this pressure ratio is between about 2 and 10, the fluid separation is dissymetric and/or unstable. The fluid separation occurs just downstream from the throat, at the start of the nozzle divergent portion, and creates lateral forces which are higher when the surface affected by the separation is considerable.

It should be observed that the affected surface is great and consequently, the lateral forces are considerable for long nozzle divergent portions with a high section ratio. These nozzles are frequently being considered for future missiles which have to supply increasingly high initial acceleration to reduce the altitudes in which the stage separations take place. Consequently, the pressure prevailing in the propellers of such missiles must be increasingly high, and the nozzles have increasingly large sizes in order to maintain correct thrust and pressure adaptations, thus the ratio of the sections of the nozzle divergent portions becomes higher. It is therefore necessary to remedy the considerable lateral forces to which these nozzles are subjected.

OBJECT OF THE INVENTION

The main object of this invention is thus to minimize or even suppress the lateral forces in a propeller nozzle.

SUMMARY OF THE INVENTION

Accordingly, a propeller nozzle, particularly for a missile, comprising a revolution pipe through which a gaseous fluid flows and which has a minimum throat section and a rearward divergent portion having a large outlet section, characterized in that the revolution pipe further comprises means disposed in the vicinity of a section internal to the divergent portion, substantially downstream from the minimum section, for making a separation of the gaseous fluid stable, symmetrical and coaxial to the nozzle.

During the start of the propeller pressure increase, to obtain a symmetrical and coaxial fluid separation in relation to the longitudinal axis of the nozzle, it is necessary that the above means according to the invention be themselves symmetrical and coaxial to the longitudinal axis of the nozzle, in the vicinity of the internal area section where the separation of gaseous fluid occurs. According to various embodiments, these means includes, for example, at least a groove or a projection on the internal separation section, and/or includes members such as recesses or protuberances, distributed equally and circularly on the internal separator section.

In the event of a projection, such as a ring, or a set of protuberances, the means can be destroyed by mechanical erosion and/or melting under the effect of the gaseous fluid, at the end of the propeller pressure increase.

It should be noticed that the means embodying the invention can be located within the initially smooth forward ramp of the nozzle described in U.S. Pat. No. 3,237,402.

BRIEF DESCRIPTION OF THE DRAWINGS

Other advantages and features of the invention will be apparent from the following particulalr description of several preferred embodiments of this invention as illustrated in the corresponding appended drawings in which:

FIG. 4, 5, 6 and 7 and 8 show various separation sections produced for tests, respectively.

DESCRIPTION OF THE PREFERRED EMBODIMENTS

Figure 1:
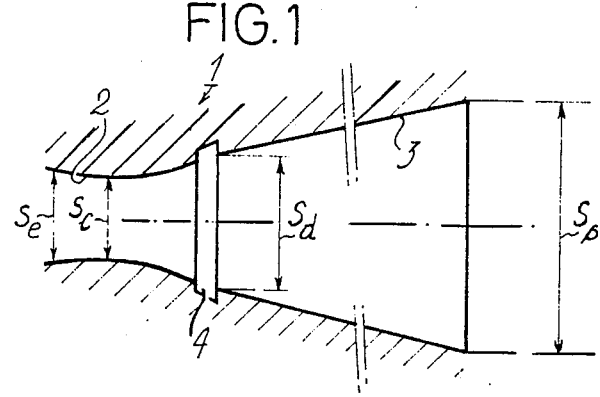
FIG. 1 is an axial schematic cross-section view of a nozzle comprising a groove located on a separation section.
Figure 2:
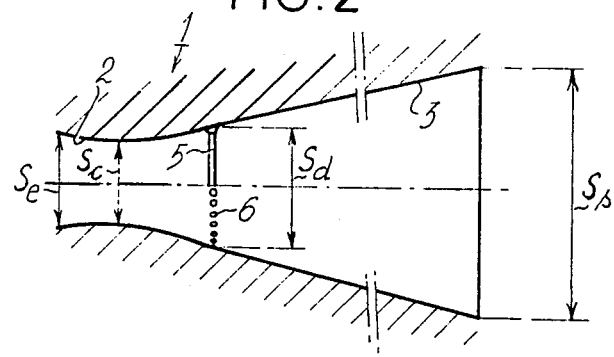
FIG. 2 shows to half axial, schematic cross-section views of a nozzle comprising either a ring or a set of protuberances located on a separation section.
Figure 3:
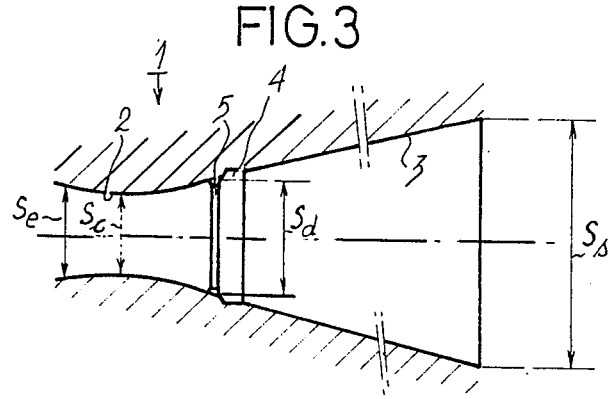
FIG. 3 is an axial schematic cross-section view of a nozzle comprising a projection, such as a ring, and a groove coupled to the projection, both located on a separation section.

As shown in FIGS. 1 to 3, a propeller nozzle is a revolution pipe 1. Pipe 1 comprises, on the side of a missile propeller engine, a short forward convergent portion 2 having an inlet cross-section $S_e$, and a minimum intermediate cross-section $S_c$, called a throat $S_c$, which is smaller, $S_c \approx < S_e$. Downstream from the throat, pipe 1 comprises a rearward divergent portion 3 which, in this example, is distinctly longer than the convergent portion and has a circular cross-section strongly increasing from the minimum throat section $S_c$ to an outlet cross-section $S_s$. Typically the cross-section ratio $S_s/S_c$ is greater than 10.

As already stated a fluid separation in the nozzle causing lateral forces on it is located just downstream, or rearward, from the minimum section $S_c$, close to the inlet of divergent portion 3, in the vicinity of a cross-section $S_d$ thereof. In practice, the separation cross-section section $S_d$ is such as $1.3 \approx < S_d/S_c \approx < 2$. According to the invention, a means for making the fluid separation stable, symmetrical and coaxial to the axis of the nozzle is provided, on the internal pipe surface in the vicinity of section $S_d$.

According to a first embodiment, this means is in the form of either small recesses distributed equally and circularly, or as shown in FIG. 1, a circular groove 4 made in the wall of the nozzle and sized suitably along cross-section $S_d$.

According to a second embodiment illustrated in FIG. 2, this means is in the form of a circular projection, such as a thin ring 5, secured to the internal surface of the nozzle downstream from cross-section $S_c$, or, a set of small radial protuberances 6, such as spikes, equidistributed circularly and inserted along section $S_d$. The circular projection can be formed by the nozzle wall itself. According to a first variant, the circular projection remains throughout the whole of the missile flight phase and is sized to limit the thrust losses as far as possible; the projection is therefore preferably of the same material as the nozzle, such as for example a compound carbon-carbon material. According to a second variant, the projection performs its function as the start of the propeller pressure increase, then disappears at the end of the pressure increase in the propeller so as to leave the internal surface of the nozzle divergent portion smooth; the disappearance of the ring or spikes is obtained either by controlled ejection, under the pressure of ejected gases, or by mechanical erosion and/or melting; in the latter case, the ring or spikes are metal or in a material such as Teflon and only withstand the ejected gases for a few tens of seconds so as to perform their tasks correctly.

According to a third embodiment, the means combines the means according to the first and second embodiments. For example, as shown in FIG. 3, a projection, such as a ring 5, coupled to a groove 4 are provided on section $S_d$.

According to other embodiments, the nozzle comprises a combination of several of the above means for making the fluid separation stable, symmetrical and coaxial. These combined means are distributed along the internal surface of the nozzle, in the vicinity of separation section $S_d$. The inner diameter of the means 4, 5 or 6, according to the invention, is always greater than that of throat cross-section $S_d$.

Examples of embodiment and test results indicating the reduction in the lateral forces on the walls of a nozzle, are now provided.

For these tests, the nozzle is of a type comprising a tapered divergent portion with a semi-angle at the apex of 17° and an inner diameter on the throat of $\phi_c$. The means located on the internal wall of the nozzle is placed in the separation section $S_d$ at a distance from the throat of between 0.5 $\phi_c$ and 0.7 $\phi_c$.

FIG. 4 shows the case of a groove 4 located between 0.52 $\phi_c$ and 0.69 $\phi_c$ with respect to the throat, and having a width of 0.17 $\phi_c$ and an average depth of 0.15 $\phi_c$.

FIG. 5 shows a ring 5 placed at 0.53 $\phi_c$ from the throat and having an average height of 0.052 $\phi_c$.

FIG. 6 shows a series of spikes 6 having a height $h = 0.05\ \phi_c$ and located at 0.6 $\phi_c$ from the throat and equidistributed circularly every 15°.

FIG. 7 shows an axial projection 5' having a height of 0.1 $\phi_c$ and a width of 0.15 $\phi_c$.

FIG. 8 shows an axial projection 5" followed by an axial groove 4' whose widths are 0.08 and 0.09 respectively and which have a height of 0.1 $\phi_c$.

Figure 9:
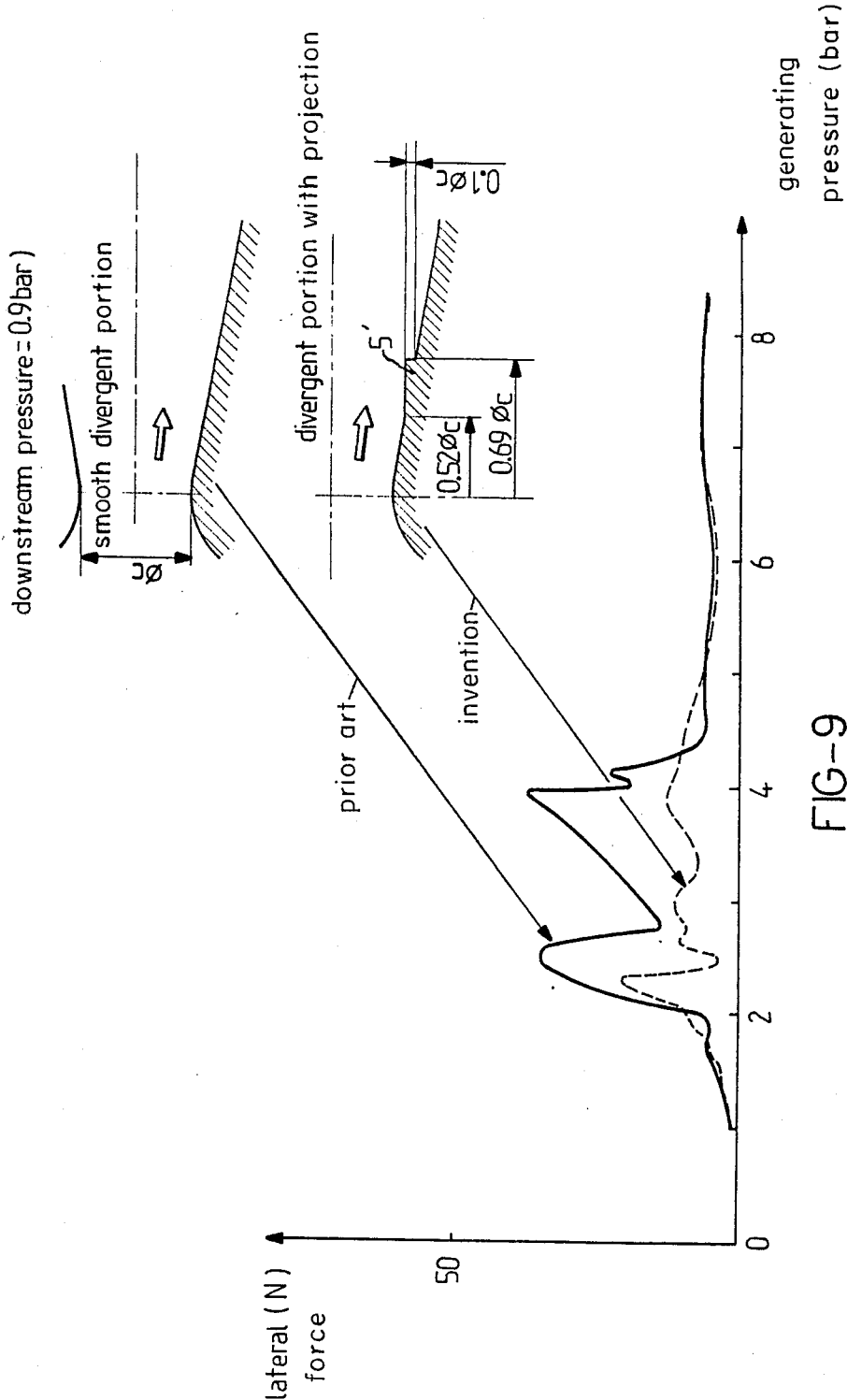
FIG. 9 is a diagram illustrating two variations in the lateral force depending on a nozzle embodying to the invention, respectively.

FIG. 9 is a diagram showing variations in the lateral force depending on the generating pressure with a smooth divergent type nozzle according to the prior art, and with a nozzle according to the invention comprising a projection 5'.

What we claim is:

1. An expanded propeller nozzle, comprising
   (a) a revolution pipe through which a gaseous fluid flows including a throat portion having a minimum cross-section and a divergent portion having an outlet of maximum cross-section the configuration of said pipe throat and divergent portions producing dissymmetric fluid separation relative to the longitudinal axis of said pipe at an area of said divergent portion downstream of said throat portion during a primary phase of gaseous fluid flow through said pipe of a duration less than 50 ms; and (b) annular stabilizing means arranged about the inner surface of said divergent portion at a distance from said throat portion between 0.5 and 0.7 times the inner diameter of said throat section and extending into the path of flow of the gaseous fluid, said stabilizing means having an inner diameter greater than that of said throat section for rendering said fluid separation stable, symmetrical, and coaxial with respect to the longitudinal axis.

2. Apparatus as defined in claim 1, wherein said stabilizing means comprises at least a groove.

3. Apparatus as defined in claim 1, wherein said stabilizing means comprises a plurality of recesses.

4. Apparatus as defined in claim 1, wherein said stabilizing means comprises at least a projection.

5. Apparatus as defined in claim 1, wherein said stabilizing means comprises a plurality of protuberances.

6. Apparatus as defined in claim 1, wherein said stabilizing means comprises at least a groove and projection being coaxial with said divergent portion.

7. Apparatus as defined in claim 1, wherein said stabilizing means is destroyed as a result of mechanical erosion and melting under the effect of the gaseous fluid.

* * * * *